Patented July 25, 1944

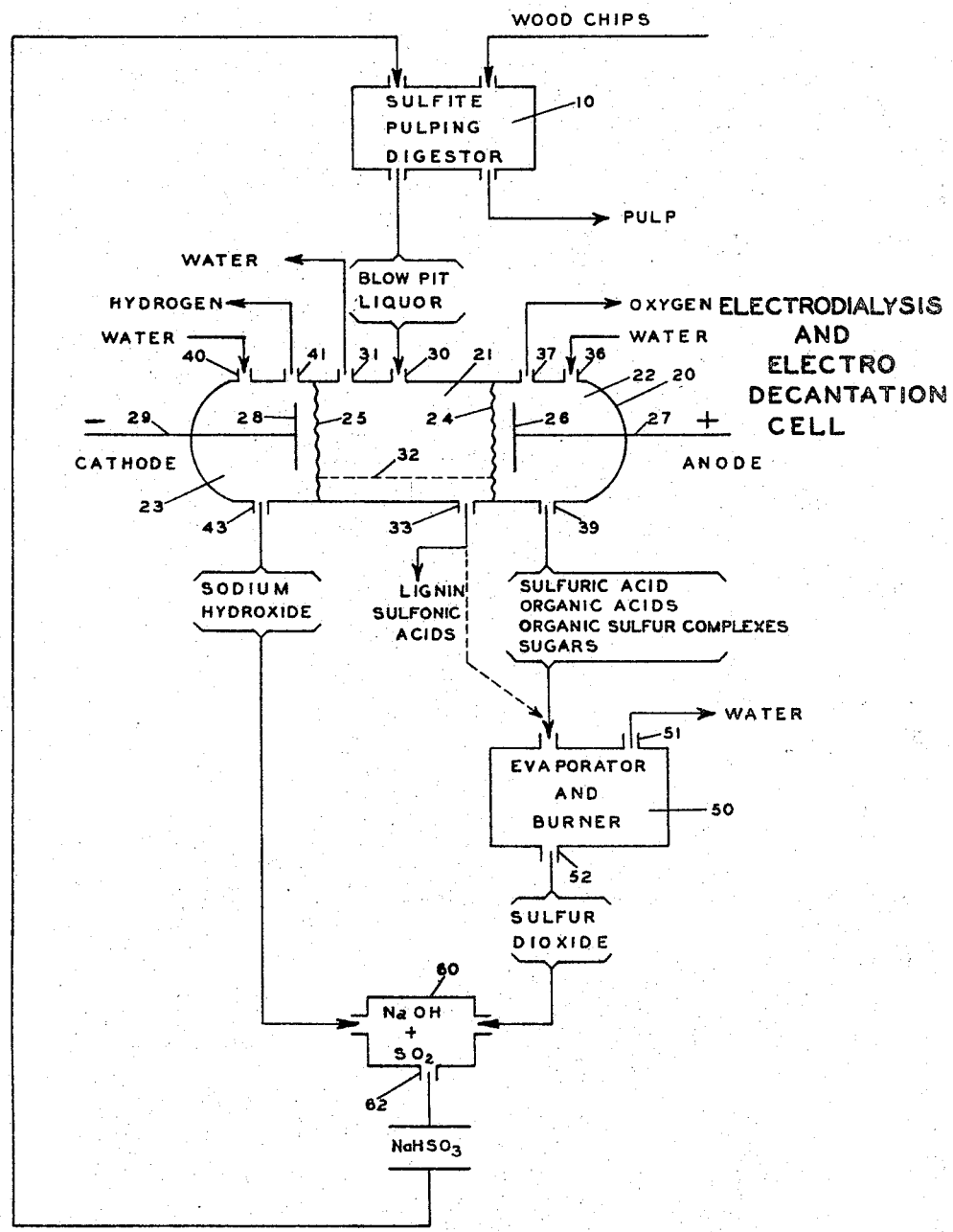

2,354,553

UNITED STATES PATENT OFFICE 2,354,553

METHOD OF RECOVERING CONSTITUENTS OF WASTE SULPHITE LIQUOR

Daniel L. Sherk, Cloquet, Minn.

Application January 10, 1940, Serial No. 313,221

6 Claims. (Cl. 204—180)

The present invention relates to improvements in wood pulping procedures, and more particularly, to improvements in the sulphite processes for pulping woods.

The pulping of wood may be accomplished according to the so-called acid sulphite process utilizing calcium acid sulphite, or in accordance with the so-called neutral sulphite process utilizing sodium sulphite.

For many reasons it is desirable to use sodium sulphite or sodium acid sulphite in the pulping procedure, but the relatively large cost of these sodium compounds as compared with the corresponding calcium acid sulphite has restricted the use of the former.

In accordance with the present invention, an improved procedure is provided for recovering the reagents used in the sulphite pulping process with the result that the sodium sulphite and sodium acid sulphite procedures may be utilized at low costs comparable with those of the calcium acid sulphite procedure.

It is, accordingly, an object of the invention to provide an improved sulphite wood pulping procedure in which the reagents are recovered for re-use.

More specifically, it is an object of the invention to provide an electrodialysis and electrodecantation procedure for recovering (or separating) the sodium or other basic ions in the form of sodium or other hydroxide and the sulphite ion ultimately in the form of sulphur dioxide for re-combination and re-use in the pulping procedure.

In the present invention the process of electrodialysis is utilized. In this process membranes of various degrees of porosity or distinct electrical characteristics separate the electrodes in a cell in which electrolysis takes place, with the result that different chemical constituents may be separated. In a simple arrangement, a three-compartment cell hereinafter described, sulphite waste liquor may be electrodyalized so as to recover useful reagents. In the early stages of the electrolysis basic constituents separate and collect in the cathode compartment, while acidic and neutral constituents collect in the anode compartment. At later stages in the electrolysis, the little understood phenomenon of electrodecantation takes place in the middle compartment, with the result that a colloidal suspension of some of the lignin sulphonic acid separates into two layers during the passage of the current. An upper layer may be substantially pure water, while a lower layer becomes a concentrated suspension of the colloidal material originally present in dilute form. Thru this procedure one may recover up to 23% of the total solids in a sulphite waste liquor as an aqueous colloidal solution of lignin sulphonic acid containing more than 10% total solids, and in addition the basic constituents of the reaction may be recovered as an hydroxide.

In accordance with the improved pulping procedure of the present invention, it is also possible to produce as relatively pure compounds, lignin sulphonic acids, which are useful for many purposes apart from the pulping procedures, or to produce such lignin sulphonic acids along with other materials as a source of sulphur dioxide useful in the pulping procedure.

It is, therefore, an additional object of the present invention to provide a method for producing relatively pure lignin sulphonic acids.

The present invention is illustrated with reference to a flow sheet of the process shown in the drawing.

In carrying out the present invention, wood chips are introduced into a digester 10, along with a suitable quantity of sulphite pulping liquor, containing such bases as calcium sodium, magnesium or mixtures such as calcium-magnesium or calcium-sodium. Typical cooking liquors are sodium acid sulphite, or neutral sodium sulphite liquors. In the preferred procedure, sodium acid sulphite or sodium sulphite are used because of the desirable pulps thereby produced, and because of the greater variety of woods that may be readily pulped with these agents.

After a suitable pulping interval, the wood chips are reduced to pulp and are blown from the digester 10, the pulp being separated from the blow pit liquor. The blow pit liquor is then subjected to electrodialysis in an electrodecantation cell generally designated 20.

The electrodecantation cell is preferably provided with three compartments, altho more may be used. In the cell illustrated there is an intermediate compartment 21, an anode compartment 22, and a cathode compartment 23. The compartments being defined by semi-permeable membranes 24 and 25, which may, for example be composed of cellulosic sheet made from re-generated cellulose.

Within the anode compartment 22, there is positioned an anode 26, which is connected to a source of positive potential by means of wire 27. Within the cathode compartment 23, there is a cathode 28, which is likewise connected to a suitable source of negative potential by means of wire 29.

The intermediate compartment is provided with an inlet 30 for the introduction of blow pit liquor, and an upper outlet 31, for the removal of water which is separated in substantially pure condition during the process. At the bottom of the intermediate compartment 21, there is an outlet 33 for the removal of lignin sulphonic acids which are isolated in substantially pure form as an aqueous layer below line 32 in the electrodecantation procedure.

The anode chamber 22 is provided with an inlet 36 for the introduction of water and an outlet 37 for the removal of oxygen which is formed during the electrodecantation procedure. At the bottom of anode chamber 22, there is an outlet 39 for the removal together in aqueous solution of acidic substances, such as sulphuric acid and a variety of organic acids, also some of the lignin compounds which may be organic sulphur complexes, and sugars, all of which are derived from the blow pit liquor by means of the electrodecantation procedure.

Without limitation of the invention, it may be stated by way of explanation that experience shows that sulphur dioxide exists as sulphur dioxide remaining from cooking and as labile compounds which liberate sulphur dioxide readily, as sulphuric acid and sulphates, and as the various lignin sulphonic acids and sulphonates. It seems quite certain that there are at least two forms of one type of lignin sulphonic acid in the waste liquor, and there may be acids with more than one sulphonic group in the molecule. These substances apparently penetrate semipermeable membranes to different degrees and separations between varying colloidal materials are possible by suitable choice of membranes and conditions. Of the various fractions, the one remaining in the middle compartment is lignin sulphonic acid but other lignin compounds pass through membrane 24 into anode chamber 22. In regard to the sugars, it may be stated that by simple dialysis against water, it is possible to separate sugars, but their ready passage to the anode compartment 22, through the membrane 24, under the influence of an electrical current is unexpected, but as it occurs, the problem of purifying the lignin sulphonic acids is greatly simplified by, in effect, combining two steps in one. The foregoing explanation is not intended as a limitation upon the invention.

The cathode chamber is provided with an inlet 40 for the introduction of water into the cell, and an outlet 41 for the removal of hydrogen which is generated during the electrodecantation. At the bottom of the cathode chamber, there is an outlet 43 for the removal of hydroxide solution which is sodium hydroxide, when a sodium sulphite pulping liquor is used, and calcium hydroxide when calcium sulphite pulping liquor is used.

At the beginning of the operation, blow pit liquor is introduced into the intermediate compartment 21, and water is introduced into the anode compartment 22 and cathode compartment 23. Current is then passed through the electrodecantation cell by means of conductors 27 and 29. At the beginning of the operation, the voltage may be high, but soon drops as the electrodecantation proceeds. The drop in voltage is due to the increased conductivity of the liquid within compartments 22 and 23, which occurs as electrolytes pass thru the membranes making the water acidic in the anode compartment and basic in the cathode compartment. The procedure may be run as a batch procedure but is preferably run as a continuous procedure, blow pit liquor and water being continuously introduced in the openings 30, 36 and 40, and the various separated constituents being continuously removed thru pipes 31, 41, 37, 43, 33 and 39, as shown in the flow diagram.

The constituents removed through opening 39 of the anode chamber include sugar as well as organic and inorganic sulphur complexes. These are evaporated and burned in the evaporator and burner generally designated 50. Water given off in evaporation and drying is removed through opening 51 and sulphur dioxide, which is a product of the burning procedure is removed through opening 52. The sulphur dioxide thereby produced is introduced into a reaction chamber 60 along with the sodium hydroxide, which is recovered and removed from the cathode chamber 23 through pipe 43. The hydroxide, namely sodium hydroxide in the event a sodium sulphite cooking liquor is being used, or calcium hydroxide in the event a calcium sulphite liquor is being used and sulphur dioxide are reacted in vessel 60, and thereby form substantially pure sulphite cooking liquor, which is returned to the digester 10 by means of pipe 62.

In some instances, the semi-permeable diaphragm 24 may be dispensed with in which case the lignin sulphonic acids which are indicated as being recovered separately thru 33 would be recovered along with the remaining constituents thru pipe 39. In such a mode of operation, the sulphonic radical contributes to the sulphur dioxide recovered in the process.

Utilizing the procedure herein described, 70 to 95% of the base may be recovered with a power consumption ranging from 5 to 15 kilowatt hours per pound of sodium hydroxide (dry basis).

In the electrodecantation procedure, the concentration of sodium hydroxide in the cathode chamber 23 may easily be built up to 1% from which a sodium bisulphite cooking acid can be prepared directly. The concentration of sodium hydroxide solution recovered from neutral sulphite waste liquor may be built up to as much as 6.4% from which, without concentration, a 10% solution of sodium sulphite ($Na_2SO_3$) can be prepared directly for reuse in the cooking of wood, by addition of sulphur dioxide.

Many obvious variations will occur to those skilled in the art and may be made without departing from the spirit of the invention described and claimed.

What I claim is:

1. A process for the preparation of relatively pure relatively concentrated lignin sulphonic acids which comprises introducing waste liquor from sulphite wood pulping processes into an intermediate compartment of an electrodecantation cell having an intermediate compartment and adjacent compartments separated from the intermediate compartment by semipermeable membranes, passing a unidirectional electric current from one of the adjacent compartments through the semi-permeable membrane through the intermediate compartment and other semi-permeable membrane to the other adjacent compartment until a sulphonic acid containing layer is formed therein, and removing the thus separated relatively pure sulphonic acid layer from the intermediate compartment.

2. The method of treating blow pit liquor from sulphite wood pulping to recover basic constituents and sulphur constituents in concentrated form for direct reuse in preparing fresh sulphite cooking liquor which comprises introducing the blow pit liquor into an electrodialysis cell having a plurality of permeable-membrane-separated compartments, passing an electric current through the cell from one compartment to another whereby in one compartment the basic constituents of the blow pit liquor are separated and concentrated in basic hydroxide form, and in another compartment, sulphur constituents are concentrated as sulphur compounds, and separately removing the concentrated basic hydroxide and concentrated sulphur compounds.

3. The method of claim 2 further characterized in that the concentrated sulphur compounds are evaporated and burned yielding sulphur dioxide and the latter is directly combined with the concentrated basic hydroxide to form directly usable fresh sulphite cooking liquor.

4. The process of claim 2 further characterized in that the process is continuous, the blow pit liquor being continuously introduced and the separate collected concentrated solutions of basic hydroxide and sulphur constituents being continuously removed from the cell.

5. The method of treating the blow pit liquor from sodium sulphite wood pulping to recover the sodium and sulphur constituents in concentrated form for direct reuse in preparing fresh cooking liquor which comprises introducing the blow pit liquor into an electrodialysis cell having a plurality of permeable-membrane-separated compartments, passing an electric current through the cell from one compartment to another whereby sodium hydroxide is separated and concentrated sufficiently for direct reuse in one compartment and sulphur compounds are collected in concentrated form in another compartment, removing the concentrated sodium hydroxide from the cell, removing and drying concentrated sulphur compounds, then burning the dried sulphur compounds to form sulphur dioxide, and then reacting the sulphur dioxide with the concentrated sodium hydroxide to form directly reusable sodium sulphite cooking liquor.

6. The method of claim 5 further characterized in that the electrodialysis cell has three compartments in series through which the electric current is passed, the blow pit liquor being introduced into the center compartment, the concentrated sodium hydroxide solution being collected in one end compartment, a concentrated solution of sulphur complex being collected in the other end compartment and concentrated lignin sulphonic acids being collected as a lower layer in the center compartment.

DANIEL L. SHERK.